United States Patent
Biggs et al.

(10) Patent No.: US 7,602,989 B2
(45) Date of Patent: Oct. 13, 2009

(54) REALTIME 2D DECONVOLUTION SYSTEM AND METHOD

(76) Inventors: David S. C. Biggs, 19 Towpath La., Waterford, NY (US) 12188; Michael E. Meichle, 10811 NE. 113 Ct. Apt. J-308, Kirkland, WA (US) 98033

( * ) Notice: Subject to any disclaimer, the term of this patent is extended or adjusted under 35 U.S.C. 154(b) by 663 days.

(21) Appl. No.: 11/136,285

(22) Filed: May 24, 2005

(65) Prior Publication Data

US 2005/0265621 A1 Dec. 1, 2005

Related U.S. Application Data

(60) Provisional application No. 60/574,679, filed on May 26, 2004.

(51) Int. Cl.
*G06K 9/40* (2006.01)
*G06K 9/64* (2006.01)
(52) U.S. Cl. ...................... 382/260; 382/279
(58) Field of Classification Search ........... 382/254, 382/260, 264, 265, 279; 348/241, 349, 352, 348/607
See application file for complete search history.

(56) References Cited

U.S. PATENT DOCUMENTS

| | | | | |
|---|---|---|---|---|
| 5,550,935 | A | * | 8/1996 | Erdem et al. ............. 382/260 |
| 5,627,918 | A | * | 5/1997 | Carasso .................. 382/254 |
| 5,949,914 | A | * | 9/1999 | Yuen ..................... 382/254 |
| 6,859,564 | B2 | * | 2/2005 | Caron .................... 382/264 |
| 2005/0201637 | A1 | * | 9/2005 | Schuler et al. ............ 382/284 |
| 2008/0075386 | A1 | * | 3/2008 | George et al. ............. 382/275 |

OTHER PUBLICATIONS

Biggs, David S.C. et al., "Acceleration of iterative image restoration algorithms," Applied Optics, Mar. 10, 1997, vol. 36, No. 8, pp. 1766-1775.
Hanser, Bridget M. et al., "Application of Phase Retrieved Pupil Functions in Wide-Field Fluorescence Microscopy," Proceedings of SPIE, vol. 4621, 2002, pp. 40-46.
Cogswell, C.J. et al., "3D Fourier analysis methods for digital processing and 3D visualization of confocal transmission images," SPIE, vol. 2412, 0-8194-1759-9/95, pp. 230-235.
Ayers, G.R. et al., "Iterative blind deconvolution method and its applications," Optics Letters, vol. 13, No. 7, Jul. 1988, pp. 547-549.
Holmes, Timothy J., "Blind deconvolution of quantum-limited incoherent imagery: maximum-likelihood approach," J. Opt. Soc. Am. A, vol. 9, No. 7, Jul. 1992, pp. 1052-1061.
Fish, D.A. et al., "Blind deconvolution by means of the Richardson-Lucy algorithm," J. Opt. Soc. Am. A, vol. 12, No. 1, Jan. 1995, pp. 58-65.
Kundur, Deepa et al., "A Novel Blind Deconvolution Scheme for Image Restoration Using Recursive Filtering," IEEE Transactions on Signal Processing, vol. 46, No. 2, Feb. 1998, pp. 375-390.

* cited by examiner

*Primary Examiner*—Yon Couso
(74) *Attorney, Agent, or Firm*—Caesar, Rivise, Bernstein, Cohen & Pokotilow, Ltd.

(57) ABSTRACT

A real time 2D deconvolution system and method for processing a time sequence, or video sequence, of microscopy images. A system is provided that includes a first algorithm for processing a first image in the set of 2D images, wherein the first algorithm calculates an estimated point spread function (PSF) by analyzing data in the first image; and a second algorithm for processing a set of subsequent images in the set of 2D images, wherein each subsequent image is processed based on the estimated PSF, under the assumption of slowly-varying image change. A PSF refinement system may optionally improve the PSF estimate, between each image, as computation time permits.

18 Claims, 4 Drawing Sheets

REALTIME 2D DECONVOLUTION SYSTEM AND METHOD

The present application claims the benefit of provisional application Ser. No. 60/574,679, filed May 26, 2004, entitled "A SYSTEM TO IMPROVE IMAGES IN REAL TIME."

BACKGROUND OF THE INVENTION

1. Technical Field

The present invention relates generally to the field of processing two dimensional images, and more specifically, to a real time system to automatically improve the resolution, contrast, and clarity of a stream of two dimensional images using real time deconvolution.

2. Related Art

Two dimensional (2D) images obtained from a variety of optical microscopy modalities often contain blur and noise, which reduce contrast, resolution, and clarity of the image. Such defects can result from any number of causes, including lens imperfections, external noise, etc. In fact, any image captured by a digital camera, which is inherently two dimensional in nature, is subject to such defects. Such images are often processed in order to produce a restoration that is a more faithful representation of the real specimen appearing in the image. Unlike many forms of digital imaging, images acquired with optical microscopy, of virtually all modalities, often have significant degradation due to optical limitations. Although optical microscopy optics themselves are of excellent quality when used within their design conditions, they are frequently pressed to the very limits of resolution, or used with specimens that are not within the design conditions. For example, optical microscopy objectives are designed for specific cover-glass thickness, or require tight tolerances on the index of refraction of all materials (immersion oil, cover-glass, embedding medium, and specimens themselves) in the light path. If these conditions are not met, severe spherical aberration is induced. A common situation is to observe a specimen that is in water and is located on the surface of a slide, rather than immediately beneath the cover-glass. This violates two requirements; first the index of refraction of the water is not matched to the immersion oil. Second, the objectives are corrected for specimens to be immediately beneath the cover glass. Numerous processing techniques for improving the image quality of microscopy images are known, and often require substantial computational resources. (See, Hanser, B., Gustafsson, M., Agard, D., Sedat, J., "Application of Phase Retrieved Pupil Functions in Wide-Field Fluorescence Microscopy", *Proceedings of SPIE*, 4621, 40, 2002 and Sieracki, C., Hansen, E., "Pupil functions for aberration correction in 3D microscopy", *Proceedings of SPIE*, 2412, 99 (1995).)

In many applications, a stream of images are captured, which when played back show motion or movement occurring within an imaged region. The ability to view the images in a real time playback mode allows the user to better analyze the subject matter captured in the images. Modern digital CCD cameras that are typically used in microscopy can capture mega-pixel images at video rates. Enhancing such a volume of data can require significant computational resources, as each image must be separately processed. Given these constraints, an effective restoration or enhancement of an image sequence cannot easily be accomplished in a real time fashion.

As noted, various approaches are known for processing images. Some of the more effective algorithms utilize a deconvolution process, which requires many computations that cannot be done in real time. One such approach for improving image quality involves the use of blind deconvolution algorithm, which is used routinely for processing three dimensional volumes captured by optical microscopes. "Blind deconvolution" refers to restoring an image when the blurring mechanism is unknown and is determined from the image itself. The blind deconvolution method produces an estimate of the point spread function (PSF). This estimated PSF is a characterization of the optical degradation of the image. For a given set of images, the PSF remains moderately constant, as the imaging conditions are not changing for a specific microscopy specimen and microscope slide/immersion oil configuration. A knowledge of the PSF permits a deconvolution process, where optical degradation is removed from the image by calculation.

Algorithms involving non-blind deconvolution, where the blur function is known a priori, such as that provided with a Wiener filter, are also used in the field of reducing noise and blurred data. (See, Ayers, G., and Dainty, A., "Iterative blind deconvolution method and its applications" *Optics Letters, Vol.* 13 (No. 7):547-549, July 1988.) However, when using such techniques, users must calibrate the system by measuring the blur, or distortions, associated with each image, which is especially cumbersome and slow in real time image treatment. In addition, a user cannot perform the image treatment and image capturing at the same time.

Accordingly, there are needs for a fast, automatic, system for enhancing a stream of two dimensional images that would allow for real time (or near real time) playback.

SUMMARY OF THE INVENTION

The present invention addresses the above-mentioned problems, as well as others, by providing a system and method for processing a stream of two dimensional images using both a blind deconvolution algorithm and a non-blind deconvolution algorithm. In a first aspect, the invention provides a system for processing a set of two dimensional (2D) images, comprising: first algorithm for processing a first image in the set of 2D images, wherein the first algorithm calculates an estimated point spread function (PSF) by analyzing data in the first image; and a second algorithm for processing a set of subsequent images in the set of 2D images, wherein each subsequent image is processed based on the estimated PSF.

In a second aspect, the invention provides a method for processing a set of two dimensional (2D) images, comprising: processing a first image in the set of 2D images using a first algorithm; calculating an estimated point spread function (PSF) by analyzing data in the first image; processing a second image in the set of 2D images with a second algorithm using the estimated PSF; refining the estimated PSF to generate a refined PSF; and processing a third image in the set of 2D images with a second algorithm using the refined PSF. The second algorithm shall then be much faster and simpler to compute as it relies primarily on the information computed by the first algorithm on the first image.

In a third aspect, the invention provides a program product stored on a computer readable medium for processing a set of two dimensional (2D) images, comprising: program code configured for processing a first image in the set of 2D images using a first algorithm, wherein the first algorithm calculates an estimated point spread function (PSF) by analyzing data in the first image; and program code configured for processing each of a plurality of subsequent images in the set of 2D images with a second algorithm, wherein each subsequent image is processed based on the estimated PSF. The simpler second algorithm shall be faster utilizing this quicker second algorithm.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
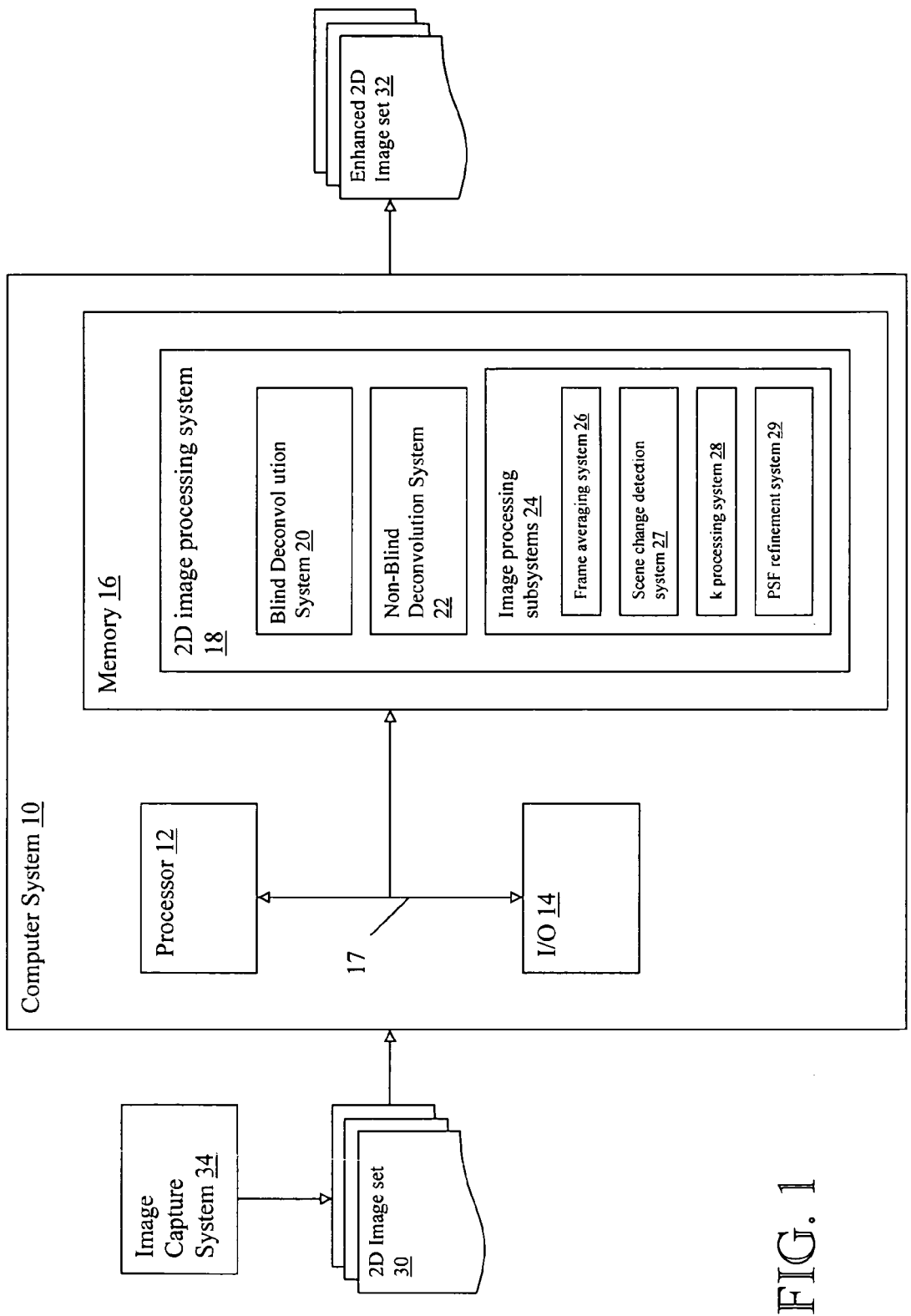
FIG. 1 depicts a computer system having a 2D image processing system in accordance with the present invention.

Referring now to FIG. 1, a computer system 10 is shown having a two dimensional (2D) image processing system 18 for processing a 2D image set 30. 2D image set 30 may for example comprise a video or image sequence of a biological specimen provided by an image capture system 34. Image capture system 34 may comprise any type of optic device, e.g., digital camera, scanner, microscopy system, telescope, etc., capable of obtaining and/or generating the 2D image set 30.

2D image processing system 18 uses both a blind deconvolution system 20 and a non-blind deconvolution system 22 to generate an enhanced 2D image set 32 that allows for real time (or near real time) viewing. As will be described in further detail below, blind convolution system 20 provides a first algorithm that is applied to a first image in the 2D image set 30. Non-blind deconvolution system 22 provides a second algorithm that is applied to each subsequent image in the 2D image set 30. Blind deconvolution system 20, which is relatively computationally intensive, iteratively processes the first image and generates an initial estimated PSF (point spread function) value based on data collected from the first image. Each subsequent image is then processed by the less computationally intensive non-blind deconvolution system 20 using the estimated PSF.

2D image processing system 18 may also include one or more image processing subsystems 24 that can be used to further manipulate the enhanced 2D image set 32. Illustrative subsystems include a frame averaging system 26, a scene change detection system 27, and a k processing system 28, and a PSF refinement system 29. These subsystems are likewise described in further detail below. In addition, although not shown, 2D image processing system 18 may include a user interface for allowing user control over the various systems and algorithms described herein.

In general, computer system 10 may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 36 such as the Internet, a local area network (LAN), a wide area network (WAN), a virtual private network (VPN), etc. Communication could occur via a direct hardwired connection (e.g., serial port), or via an addressable connection that may utilize any combination of wire-line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server, or server-server environment.

Blind Deconvolution System

As noted above, 2D image processing system 18 processes a first image in the inputted 2D image set with a blind deconvolution system 20, which calculates an initial or estimated PSF. Calculation of the initial PSF may be accomplished, e.g., by employing an iterative process. An important feature of the blind deconvolution system 20 is that it can generate the initial PSF based on information collected from the first image itself, and does not require any knowledge of the optics involved in generating the image. An illustrative technique for performing this process is described below.

The image formation process in an optical microscope can be modeled as a linear convolution operation. The image captured by a camera, g, can be described as a convolution, (*), between the specimen, f and the PSF, h, plus a noise component, n:

$$g=(f*h)+n,$$

Using an expectation maximization (EM) approach, the deconvolution algorithm can be derived from a maximum-likelihood estimation approach (see, T. J. Holmes, "Blind deconvolution of quantum—limited incoherent imagery: maximum-likelihood Approach", *J. Opt. Soc. Am. A*, Vol. 9(No. 7):1052-1061, July 1992), in which the log-likelihood measure, λ, to be maximized is:

$$\lambda=\Sigma g \otimes \log(\hat{h}*\hat{f})-\hat{h}*\hat{f}$$

where g is the observed object, ĥ is the PSF estimate, f̂ is the object estimate, * is the convolution operator, ⊗ is the correlation operator, and the summation Σ is over all pixels. The iterative algorithm that results from assuming Poisson noise statistics (a consequence of counting photons) is the familiar Richardson-Lucy type algorithm. (See, Fish, D., Brinicombe, A., Pike, E., Walker, J., "Blind deconvolution by means of the Richardson-Lucy algorithm", *J. Opt. Soc. Am. A*, 12, 1, 58.) The iterative algorithm for the object estimate $\hat{f}_k$ is:

$$\hat{f}_{k+1} = \hat{f}_k \cdot \hat{h}_k \otimes \left( \frac{g}{\hat{h}_k * \hat{f}_k} \right),$$

where $\otimes$ is the correlation operator, and * is the convolution operator. Simultaneously estimating the PSF simply requires swapping of the image and PSF variables. The estimate of the PSF is then given by:

$$\hat{h}_{k+1} = \frac{\hat{h}_k}{\sum \hat{f}_k} \cdot \hat{f}_k \otimes \left( \frac{g}{\hat{h}_k * \hat{f}_k} \right),$$

The summation is required to normalize the PSF estimate. Blind deconvolution is achieved by alternating between updating the image and PSF estimates until the desired level of restoration is achieved. (See, Ayers, G., and Dainty, A., "Iterative blind deconvolution method and its applications", *Optics Letters, Vol.* 13 (No. 7):547-549, July 1988.) The EM algorithm ensures the log-likelihood measure will increase after each iteration. The multiplicative nature of the algorithm also ensures that the non-negativity of the solution is maintained. Restoration using the EM iteration is a nonlinear process that enables frequency components in the specimen, beyond the optical diffraction limit, to be recovered. This improved resolution will then enable closely spaced features to be more easily resolved. The EM algorithm used to update the image or PSF estimate typically requires many hundred or thousand iterations for a suitable result to be achieved. This is computationally prohibitive for a real-time system, and as such, an algorithm acceleration technique is necessary to speed the convergence of the iterative update. There are a variety of optimization and extrapolation schemes that could be employed, including conjugate gradient methods, and vector extrapolation. (See, Biggs, D., and Andrews, M., "Acceleration of Iterative Image Restoration Algorithms", *Applied Optics*, Vol. 36 (No. 8), 1766-1775, 10 Mar. 1997.) Both the iterative blind and non-blind processing systems will utilize an acceleration scheme.

It should be understood that any process may be utilized by which a 2D PSF can be derived directly from the image without any knowledge of the blurring mechanism. Other known processes may include, e.g., zero sheet separation, parametric estimation, simulated annealing, generalized cross validation, minimum entropy deconvolution, and frequency domain analysis. (See, Kundur, D., Hatzinakos, D., "Blind Image Deconvolution", *IEEE Signal Processing Magazine*, 43, 1996.)

Note that the blind deconvolution system 20 generally provides an algorithm that will not converge to a desired solution when there is significant noise in the original blurred image. One of the functions of the blind deconvolution system 20 therefore involves determining when to terminate the restoration. To address this, a termination algorithm 42 is utilized to decide when additional iterations will not have a significant influence on the result. The typical behavior is for the iterations to initially improve the image to a good result, and then diverge towards a noise amplified solution. In some cases, the PSF may be over-processed, causing the PSF to degenerate towards a Dirac delta function, and the result to converge back towards the original image.

In one illustrative embodiment, blind deconvolution system 20 includes a termination algorithm that will terminate when two of the following three characteristics indicate the image is optimal:
(1) Maximizing the signal-to-noise ratio (SNR) of the restoration. A characteristic of the iterative algorithm is that low frequencies are restored first and higher frequencies later. There is a marked drop in the SNR when noise amplification occurs, which can be detected.
(2) Maximizing the difference between the original image and the restoration, thus preventing the result from tending back towards the original blurred data. However, this method is not suited for preventing noise amplification.
(3) Minimizing the total variation (TV) of the image, thus minimizing noise amplification and artifacts. The TV method is a technique used to regularize deconvolution algorithms that prefers smooth features and sharp edges. The TV of an image is simply the sum of the absolute values of the image gradient in the horizontal and vertical directions. All three criteria also exhibit local minima or maxima, so additional iterations (e.g., five) may be performed to determine if the iteration identified is really the global optimum. All three criteria can be calculated with minimal processing requirements.

Non-Blind Deconvolution System

Figure 2:
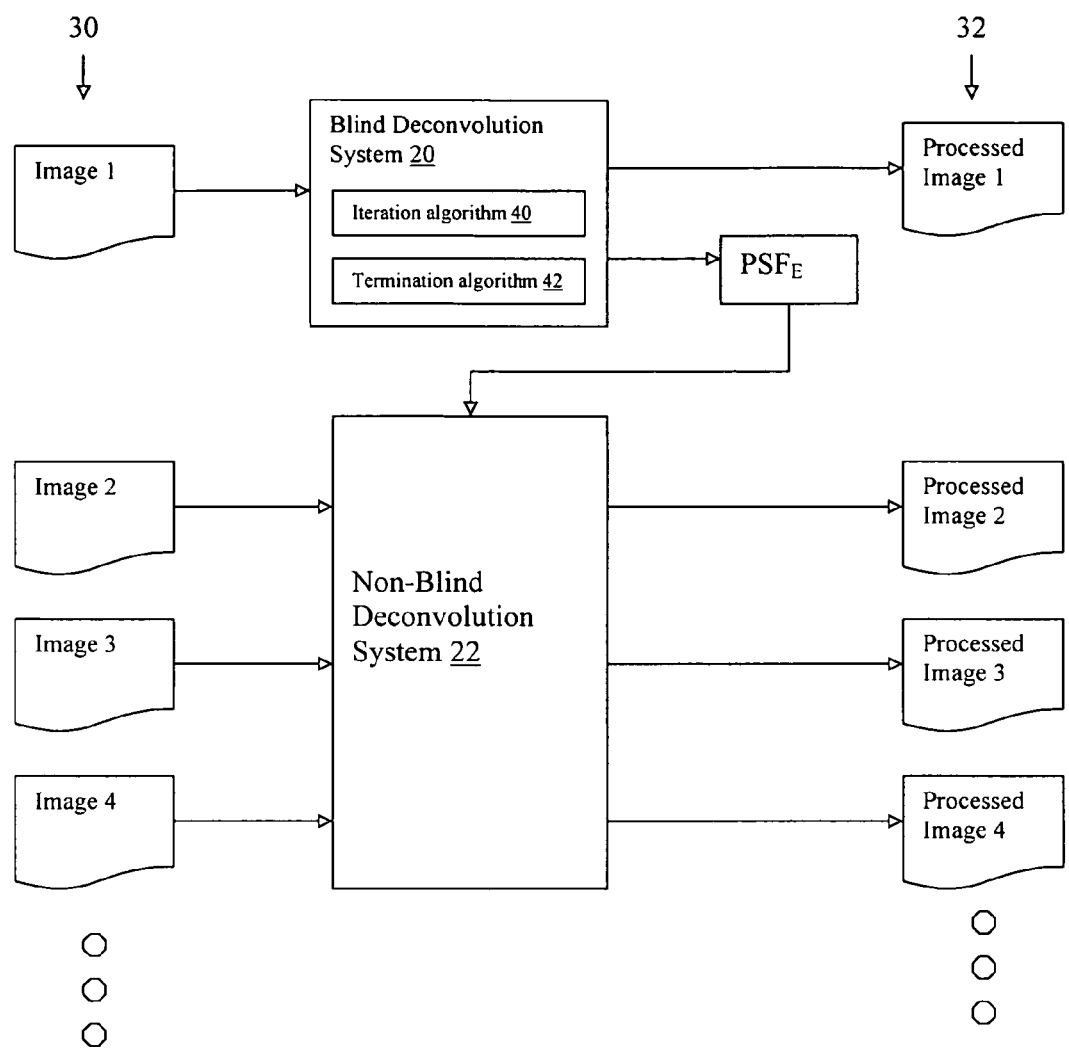
FIG. 2 depicts a flow diagram of the operation of the 2D image processing system in accordance with the present invention.

Once the initial PSF value is obtained by the blind deconvolution system 20, the PSF value is used by each next image in the inputted 2D image set 30. An illustrative example of this process is shown in FIG. 2. The estimated PSF value, shown as $PSF_E$, is generated by blind deconvolution system 20 as the first image, Image 1, is processed. $PSF_E$ is then used by non-blind deconvolution system 22 for processing each of the subsequent images of the 2D image set 30. By using $PSF_E$ to process the subsequent images, significant computational savings can be obtained.

In the event that 2D image set 30 includes a significant amount of motion, or involves a scene change, a new estimated PSF can be re-established using the blind deconvolution system 20, or the process may be terminated. A scene change detection system 27 may use any means for determining motion or a scene change, e.g., analyzing high frequency data. In addition, should the user desire to view a particular frame in detail, they can force a full deconvolution process using the blind deconvolution system 20 or a non-blind iterative deconvolution with the estimated PSF.

It should be understood that the term "non-blind deconvolution" generally refers to any algorithm that utilizes a fixed PSF to process an image. In one illustrative embodiment, non-blind deconvolution system 22 is implemented using a Wiener filter. The Wiener filter is a standard linear technique used for performing a stable linear inversion of the blurring phenomenon. For optimal results, the power spectrum of the real image and the noise are required—however, in reality, this is rarely known. An approximation often used is to set the k factor to be a constant value, but this value is usually hand-tuned for optimal performance. A typical form of the Wiener filter, W, is:

$$W = \left( \frac{H^*}{H * H^* + k} \right)$$
$$\hat{f} = \mathcal{F}^{-1}(G \cdot W)$$

Figure 4A:
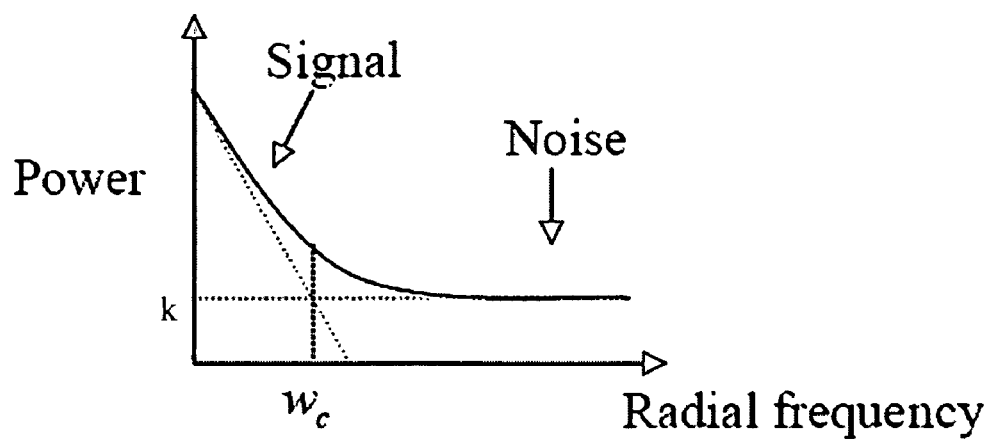
FIGS. 4A and 4B depict graphs related to a Wiener filter.
Figure 4B:
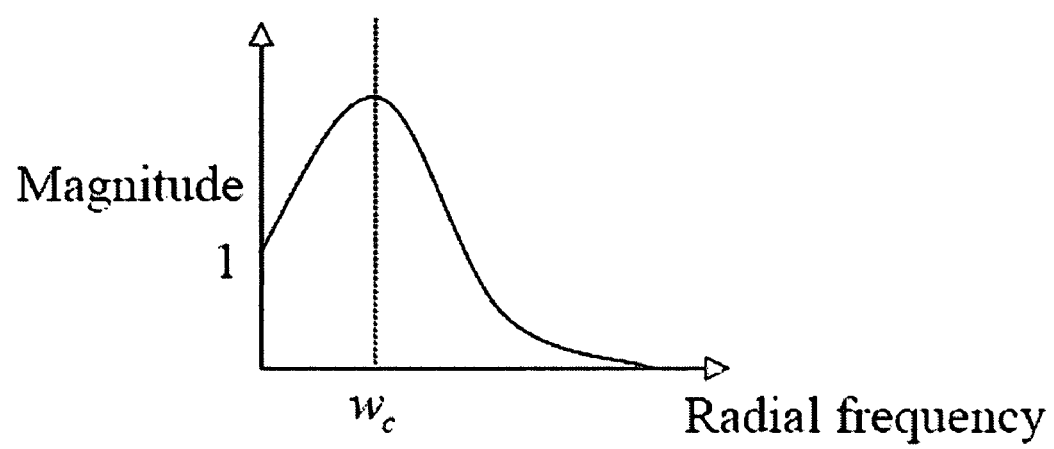

Where, G and H are the Fourier Transforms, $\mathcal{F}$, of the blurred data, g, and PSF, h, respectively. A k processing system 27 can calculate the constant k value in any manner. For instance, an optimal constant k value can be determined by analyzing the power spectrum of the blurred data with respect to radial frequency in which the noise is identified as the high frequency region where the spectrum is flat (see FIG. 4A). From this information, the frequency component, $w_c$ can be identified where the SNR is unity. The Wiener filter (see FIG. 4B) is optimal when the filter is a maximum at $w_c$, which occurs when:

$$k=|H(w_c)|^2.$$

This analysis takes into account a combination of the image spectrum, the blurring effect of the PSF and the noise level.

Experiments performed on simulated images where the original image and blur are known a priori, show an almost exact correspondence between the calculated k value, and the optimal value chosen to minimize the mean-square-error (MSE) between the Wiener filtered image, and the original known image. The frequency is also just below the bandwidth of the imaging system, and this information can be used to place spectral constraints on the estimated PSF when employing blind deconvolution.

While the Wiener filter result is not quantifiable and can only be used when the PSF is known, the implementation requires only two Fast Fourier Transforms (FFT), which can be used to perform real-time deconvolution, or to estimate the image first guess for the iterative algorithm. The Wiener filter can also be used to accelerate the speed of the restoration.

It should be noted that the Wiener deconvolution requires the computation of the Fourier transform of the new image (g), the Fourier transform of the PSF (h), and the deconvolved image (f). These are the computational intensive portions of an extra PSF estimation iterative step of the original first iterative blind deconvolution algorithm:

$$\hat{h}_{k+1} = \frac{\hat{h}_k}{\sum \hat{f}_k} \cdot \hat{f}_k \otimes \left(\frac{g}{\hat{h}_k * \hat{f}_k}\right),$$

Thus, any excess computational ability of the processor 12 may, optionally, be utilized to produce a further, but slowly varying, refinement to the original PSF derived from the first image. In effect, a single iteration of the first blind algorithm 20 may be inserted between each subsequent image and its non-blind deconvolution with very little computational expensive. This PSF refinement system 29 will adapt to any slowly-varying changes to the optical configuration, but be subject to the aforementioned termination system 42 to avoid excessive processing. This is not the only method by which the PSF can be slowly adapted or refined between the non-blind system 22 operations.

Image Processing Subsystems

As noted above, various image processing subsystems 24 may also be incorporated into 2D image processing system 18 to further enhance the imaging process. Frame averaging system 26 provides a mechanism by which frames can be "averaged" together to increase filtering and reduce noise. This relies on the fact that the noise from one frame to another is uncorrelated. Frame averaging would typically be employed for subsequent images in which there is little or no movement. Image motion is easily detected and the system can adaptive use frame averaging when appropriate.

A scene change detection system 27 may be employed to identify scene changes. This may be utilized to automatically cause a new initial PSF estimate to be generated by the blind deconvolution system 20. It may also be used to determining if frame averaging system 26 should be employed.

Also included is a k processing system 28 for providing a k value for the non-blind deconvolution system 22 (e.g., Wiener filter). In one illustrative embodiment, k may be manually entered by the user to increase or decrease filtering as desired. In another embodiment, k may be adaptively computed based on the PSF.

Other features of the 2D image processing system 18 may include the optional slowly-varying PSF refinement system 29 in which the processing of each subsequent image further refines the estimated PSF value, for use by the non-blind deconvolution system 22. The PSF refinement system may take advantage of information created by the non-blind deconvolution system 22. Thus, each subsequent image in the 2D image set is may be adaptively improved, as necessary and as permitted by a method such as the termination algorithm 42.

Figure 3:
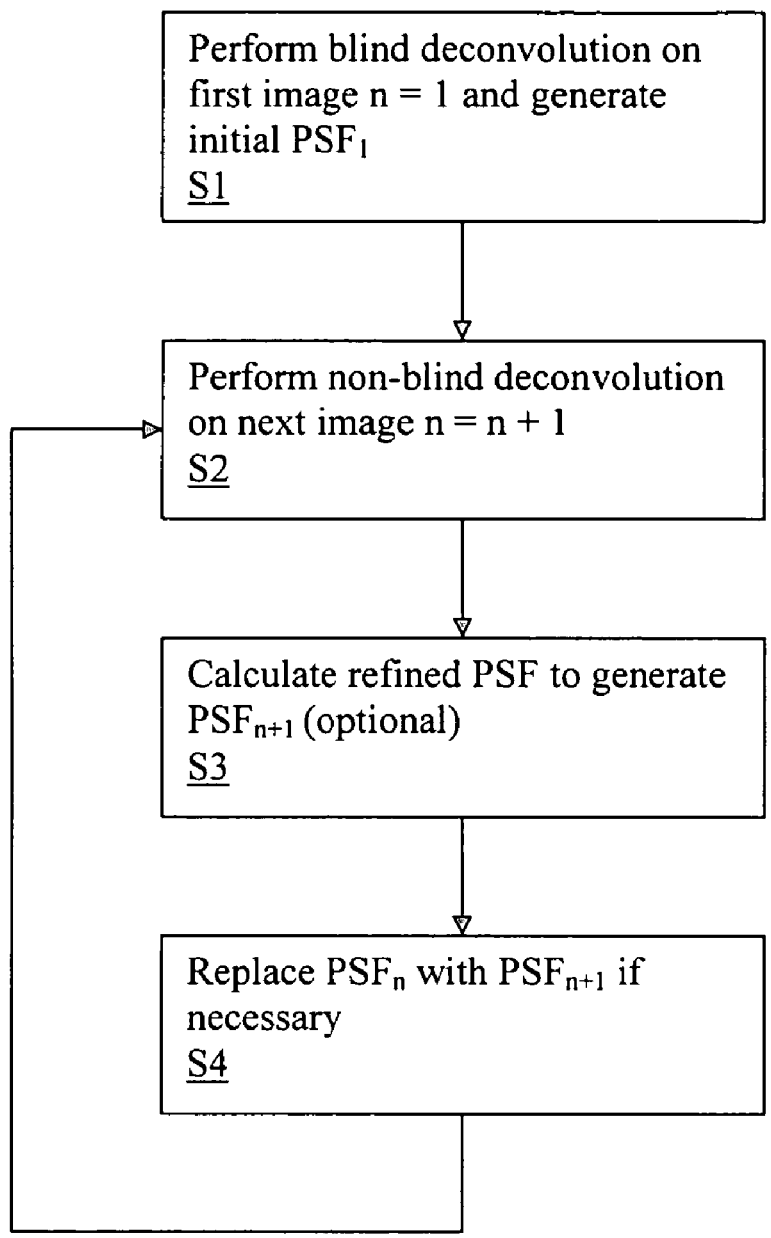
FIG. 3 depicts a flow diagram of an alternative embodiment of the operation of the 2D image processing system in accordance with the present invention.

FIG. 3 depicts a flow diagram in which 2D image processing system 18 incorporates PSF refinement system 29. At step S1, blind deconvolution is performed on the first image n=1, and an initial $PSF_1$ is generated. Next, at step S2, non-blind deconvolution is applied to the next image n=n+1, and at step S3, a refined PSF is optionally generated using PSF refinement system 29, resulting in $PSF_{n+1}$. The refined PSF may be generated using intermediate non-blind system data, such as Fourier transforms and other computational information to perform one (or more) additional PSF iteration(s) of the original EM algorithm that was used to create the initial estimate of the PSF from the first image. Thus, the PSF will be slowly updated to follow slow changes of the effective PSF of the imaging system for subsequent images. This updating process is optional, e.g., based on available computation resources, and may also be monitored by the termination algorithm 42 and the scene change detection system 27 to prevent over-processing or dramatically changed scenes. At step S4, $PSF_n$ is replaced with $PSF_{n+1}$ if necessary. The logic then loops back to step S2 where the process is repeated.

It should be appreciated that the teachings of the present invention could be offered as a business method on a subscription or fee basis. For example, a computer system 10 comprising 2D image processing system 18 could be created, maintained and/or deployed by a service provider that offers the functions described herein for customers. That is, a service provider could offer to provide image processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For instance, while the description is generally directed toward a microscopy system, it is understood that the techniques used herein could be applied to any image processing system.

The invention claimed is:

1. A system for processing a set of two dimensional (2D) images, comprising:
    a computer adapted for processing data including the 2D images, wherein said computer executes
    a first algorithm for processing a first image in the set of 2D images, wherein the computer executes the first algorithm to calculate an estimated point spread function (PSF) by analyzing data in the first image to perform a blind deconvolution; and a second algorithm for processing a set of subsequent images in the set of 2D images, wherein the computer processes each subsequent image based on said estimated PSF.

2. The system of claim 1, wherein the first algorithm comprises: an iterative process for calculating the estimated PSF; and a termination algorithm for terminating the iterative process.

3. The system of claim 1, wherein the set of 2D images are collected with an optics device, and wherein the first algorithm does not use information about the optics device to calculate the estimated PSF.

4. The system of claim 1, wherein the first algorithm utilizes an expected maximization algorithm.

5. The system of claim 1, wherein the second algorithm adaptively refines the estimated PSF after processing each of the subsequent images.

6. The system of claim 1, wherein the second algorithm utilizes a Wiener filter.

7. The system of claim 6, wherein the Weiner filter includes a constant k that can be adjusted to alter an amount of noise filtering.

8. The system of claim 1, further comprising a scene change detection system for detecting changes in the set of 2D images.

9. The system of claim 8, further comprising a frame averaging system for averaging images together to improve filtering.

10. The system of claim 8, wherein the scene change detection system performs a terminate operation or an entire recalculation of the estimated PSF estimate if a substantial scene change is detected.

11. A physically tangible computer readable medium containing a representation of a program for processing a set of two dimensional (2D) images, comprising: program code configured for processing a first image in the set of 2D images using a first algorithm, wherein the first algorithm calculates an estimated point spread function (PSF) by analyzing data in the first image to perform a blind deconvolution; and program code configured for processing each of a plurality of subsequent images in the set of 2D images with a second algorithm, wherein each subsequent image is processed based on the estimated PSF.

12. The computer-readable medium of claim 11, wherein the first algorithm comprises an iterative process for calculating the estimated PSF.

13. The computer-readable medium of claim 11, wherein the set of 2D images are collected with an optics device, and wherein the first algorithm does not use information about the optics device to calculate the estimated PSF.

14. The computer-readable medium of claim 11, wherein the first algorithm utilizes an expected maximization algorithm and the second algorithm utilizes a Wiener filter.

15. The computer-readable medium of claim 11, wherein the second algorithm adaptively refines the estimated PSF after processing each of the subsequent images.

16. The computer-readable medium of claim 11, wherein the Weiner filter includes a constant k that can be adjusted to alter an amount of filtering.

17. The computer-readable medium of claim 11, further comprising a frame averaging system for averaging images together to improve filtering.

18. The computer-readable medium of claim 11, further comprising a scene change detection system for detecting scene changes in the set of 2D images.

* * * * *